United States Patent [19]

Blanchard et al.

[11] Patent Number: 4,716,582

[45] Date of Patent: Dec. 29, 1987

[54] DIGITAL AND SYNTHESIZED SPEECH ALARM SYSTEM

[75] Inventors: Kenneth E. Blanchard, Media; Stephen V. Sanislo, Jr., Springfield, both of Pa.

[73] Assignees: Phonetics, Inc., Media, Pa.; Wisconsin Bell, Inc., Milwaukee, Wis.

[21] Appl. No.: 907,997

[22] Filed: Sep. 16, 1986

Related U.S. Application Data

[60] Continuation-in-part of Ser. No. 792,325, Oct. 28, 1985, which is a division of Ser. No. 488,999, Apr. 27, 1983, Pat. No. 4,558,181.

[51] Int. Cl.⁴ .................. H04M 1/24; H04M 11/04
[52] U.S. Cl. ............................... 379/28; 379/40; 379/41; 379/42; 379/50
[58] Field of Search .............. 179/2 A, 2 DP, 5 R, 179/5 P, 90 BD; 379/28, 37, 39, 40, 41, 42, 46, 50, 51, 106, 102, 105

[56] References Cited

U.S. PATENT DOCUMENTS

| | | | |
|---|---|---|---|
| 3,345,463 | 10/1967 | Hynes | 179/5 |
| 3,475,751 | 10/1969 | Sontag et al. | 179/5 |
| 3,505,476 | 4/1970 | Kelley, Jr. et al. | |
| 3,530,250 | 9/1970 | Schaum et al. | 179/2 |
| 3,549,810 | 12/1970 | Driscoll | 179/5 R |
| 3,585,304 | 6/1971 | Gray | 179/5 |
| 3,598,919 | 8/1971 | Lott | 179/5 |
| 3,617,640 | 11/1971 | Cichanowicz | 179/5 P |
| 3,626,102 | 12/1971 | Cameron | 179/5 |
| 3,647,974 | 3/1972 | Geisler et al. | 179/5 |
| 3,761,632 | 9/1973 | Colman | 179/5 |
| 3,842,208 | 10/1974 | Paraskevakos | 179/5 R |
| 3,868,479 | 2/1975 | Schweitzer et al. | 179/5 |
| 3,882,278 | 5/1975 | Coll | 179/5 |
| 3,899,645 | 8/1975 | Brafman | 179/90 |
| 4,068,097 | 1/1978 | Varriest | 179/2 |
| 4,095,050 | 6/1978 | Beacham et al. | 179/2 |
| 4,214,125 | 7/1980 | Mozer et al. | 179/1 |
| 4,232,195 | 11/1980 | Bartelink | 179/2 |
| 4,241,237 | 12/1980 | Paraskevakos et al. | 179/5 R X |
| 4,273,961 | 6/1981 | Blank et al. | 179/5 R |
| 4,284,849 | 8/1981 | Anderson et al. | 179/5 |
| 4,338,493 | 7/1982 | Stenhuis et al. | 179/2 |
| 4,371,751 | 2/1983 | Hilligoss, Jr. et al. | 179/5 |
| 4,399,331 | 8/1983 | Brown et al. | 179/5 |
| 4,427,974 | 1/1984 | Sheahan | 179/5 |
| 4,450,320 | 5/1984 | Ostermann et al. | 179/5 |
| 4,467,142 | 8/1984 | Rupp et al. | 179/5 |
| 4,493,947 | 1/1985 | Loveless | 179/2 A |
| 4,503,288 | 3/1985 | Kessler | 179/2 DP |
| 4,510,350 | 4/1985 | Wagner et al. | 179/5 |
| 4,520,503 | 5/1985 | Kirst et al. | 179/5 |
| 4,524,243 | 6/1985 | Shapiro | 179/5 R |
| 4,546,211 | 10/1985 | Fane, III | 179/5 |
| 4,554,418 | 11/1985 | Toy | 179/2 DP |
| 4,558,181 | 12/1985 | Blanchard et al. | 179/5 P |

FOREIGN PATENT DOCUMENTS

| | | |
|---|---|---|
| 0037573 | 10/1981 | European Pat. Off. |
| 51383 | 5/1982 | European Pat. Off. |
| 3012122 | 10/1980 | Fed. Rep. of Germany |
| 3119226 | 12/1982 | Fed. Rep. of Germany |
| 53-63910 | 6/1978 | Japan |
| 1156543 | 6/1969 | United Kingdom |
| 2005964 | 4/1979 | United Kingdom |
| 2051520 | 1/1981 | United Kingdom |
| 2105076 | 3/1983 | United Kingdom |
| 2106354 | 4/1983 | United Kingdom |
| 2138981 | 10/1984 | United Kingdom |

OTHER PUBLICATIONS

Popular Science, Jun. 1982, p. 1, "Zap Your Mom", (Advertisement by JS&A Products, Northbrook, Ill.).
Staffen et al., "Schalten per Telephone", Funkschau 24, 1982, pp. 55–57 (translation not available).
Wagner, "Telefon-Notruf-Computer", Funkschau 11, 1982, pp. 46–49.

*Primary Examiner*—Keith E. George
*Attorney, Agent, or Firm*—Body, Vickers & Daniels

[57] ABSTRACT

A portable, self-contained device for monitoring an area and reporting conditions automatically over standard telephone lines is disclosed. The device communicates through a modem in digital code with digital terminals or in synthetic speech when a digital terminal is not used.

4 Claims, 6 Drawing Figures

DIGITAL AND SYNTHESIZED SPEECH ALARM SYSTEM

REFERENCE TO PARENT APPLICATIONS

This is a continuation-in-part of application Ser. No. 792,325, filed Oct. 28, 1985 which is in turn a division of application Ser. No. 488,999, filed Apr. 27, 1983, now U.S. Pat. No. 4,558,181.

FIELD OF THE INVENTION

This invention relates to the art of portable devices for monitoring local areas and more particularly to a portable device which can be used to monitor selected conditions at any location having a standard telephone jack or terminal and to communicate reports regarding such selected conditions in either machine readable or synthetic speech formats.

INCORPORATION BY REFERENCE

This application sets forth an improvement in the invention described and claimed in U.S. Pat. No. 4,558,181. That patent describes a portable device for monitoring conditions at a selected location having a synthesized speech output. The output of the device is connected to the telephone network. The device itself contacts remote locations by engaging the telephone network and automatically dialing selected numbers, sensing the answering of the telephone, and giving its report in synthesized speech. That patent, together with U.S. Pat. Nos. 3,549,810; 3,505,476; 3,617,640; and 4,241,237 are incorporated by reference herein.

BACKGROUND OF THE INVENTION

U.S. Pat. No. 4,558,181 describes a device which monitors several selected conditions at a local area. If the selected conditions exceed predetermined limits or deviate from normal in some other manner, the device places a telephone call to one of several preselected telephone numbers and waits for the preselected telephone to be answered. If an answer is received, the device gives a speech message describing its location and the alarm condition detected. If the preselected telephone is not answered, the device calls another preselected telephone number in its list of telephone numbers in an attempt to reach someone and report the alarm condition. The device is exceptionally versatile in the types of conditions which can be monitored and in the means of providing information to persons designated when alarm conditions exist. The device had only a single mode of communication; however, this is through synthetic speech.

The Invention

The present invention contemplates a portable monitoring device for monitoring conditions at a selected location and communicating an alarm when conditions deviate from preselected ranges. The present invention communicates its alarm over the existing telephone network in either a synthesized speech format or in a digital data representation format.

In accordance with one aspect of the present invention, there is provided a portable self-contained device for monitoring a selected local area having a standard telephone terminal connected to the commercial telephone network for the occurrences of any of a plurality of conditions adjacent the local area. These conditions can be high or low temperature, power interruption, operation of a smoke, fire or burgular alarm, existence of a high water level, entrance through a restricted area or virtually any other electrically monitorable condition. When one or more of the selected conditions deviate from preset ranges, an alarm signal is generated and the system of the present invention communicates such alarm signal to either a remote data reception terminal or a remote human being through transmission of an alarm signal in digital code or synthetic speech.

In accordance with the general scheme of the present invention, there is provided an electronic circuit and several sensors at the local area to be monitored. The sensors generate signals when the conditions being monitored vary from a preselected range or exceed certain limits. Analog processing circuits condition the signals from the sensors and supply appropriate signals to a microprocessor through an analog to digital converter. The microprocessor has associated with it random access memory (RAM) into which telephone numbers, identification codes and other data required for the operation of the circuit is loaded by means of a key pad. When the output of one of the sensors indicates that a preselected limit has been exceeded, an alarm condition is established and an alarm signal is generated. The alarm signal causes the circuit to generate telephone dialing signals initiating a telephone call on a standard telephone circuit interconnection. The system first attempts to reach the telephone number stored in its first preselected telephone number memory location. If an answer occurs at this location, the circuit looks for a digital acknowledgement signal or "handshake" informing the circuit that a digital terminal is connected at the number recalled. Once this handshake is received, the microprocessor applies digital signals to a modem which communicates with the terminal at the number called such that a code identifying the location being monitored and a message describing the alarm condition are sent to the terminal. If an answer from the first destination number is not received, the circuit continues to try this number until an answer is received or a predetermined period of time expires. After the expiration of this period of time, the circuit calls secondary preselected telephone numbers stored in its memory. A "speech" or "digital" designation signal is stored in association with each secondary preselected number. This designation signal tells the microprocessor the proper mode of communication for the number being called. An appropriate digital or speech format signal is generated and applied to a speech amplifier or a modem, and to the telephone lines informing the person or terminal at the preselected number of the alarm condition.

Further in accordance with the invention, means are provided for sensing the presence of a telephone call to the device and determining whether the call originating station is equipped to communicate in the digital format or should be addressed in speech. If the call originating station is digital capable, that is, the call originated from a computer-like terminal or teletype-like terminal, status information is given in digital machine readable form in one of two modes. First, if the digital inquirer so requests, the device disconnects from the call and calls the first preselected telephone number and gives a status report in machine readable form thereby reporting local conditions and verifying the operability of the call originating function of the device. Second, if the digital inquirer does not request a call back, the device gives a status report in machine readable form on the initial telephone connection. The device also has the capability of giving a synthetic speech status report in response to a telephone inquiry.

It is an object of the present invention to provide a local area monitoring device or system which will communicate alarm reports in either digital or synthetic speech formats depending upon the destination to which the report is directed. It is a further object of the present invention to provide a system which will monitor a selected area while unattended and send reports on conditions at the selected area to a remote location in a form which can be recorded or displayed without the need of an attendant at the remote location.

It is yet another object of the present invention to provide a local area monitoring device which is usable by the hearing impaired.

It is yet another object of the present invention to provide a local area monitoring device which is usable to TTY subscribers.

It is yet another object of the present invention to supply a local area monitoring device which is usable by persons having a computer terminal or personal computer and wishing their computer terminal or personal computer to perform monitoring functions at a local area remote from the computer in an unattended or unsupervised mode.

It is still another object of the present invention to provide a local area monitoring device which is easy to use, easy to install, reliable and inexpensive.

These and other objects and advantages of the present invention will become apparent from the following description taken together with the drawings which will be described in the next section.

PREFERRED EMBODIMENT

Figure 1:
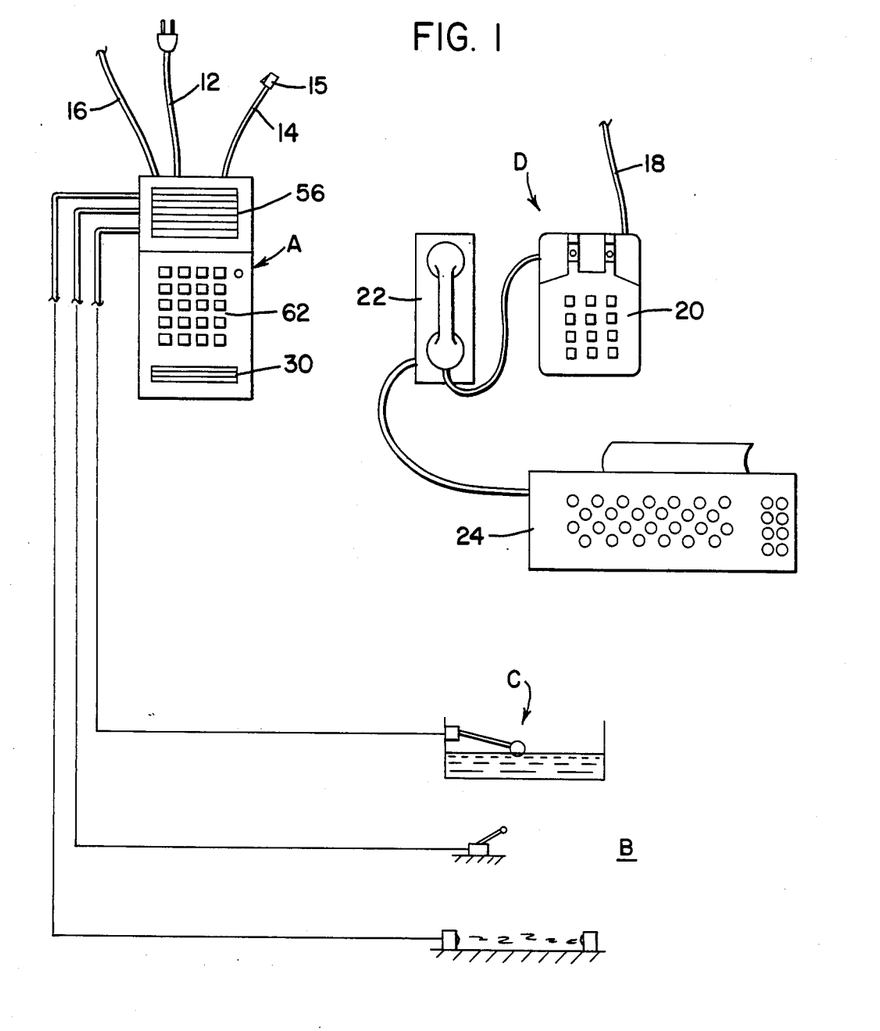
FIG. 1 is a schematic diagram showing the preferred embodiment of the present invention as it is connected to the local telephone network and a typical receiving station at a different location set up to receive calls from the preferred embodiment of the invention.

Referring now to the drawings wherein the showings are for the purposes of illustrating a preferred embodiment of the invention only and not for the purpose of limiting the same, FIG. 1 shows a portable, self-contained monitoring device. A constructed in accordance with the present invention for monitoring the local area B in which sensors C are located. The monitoring device A is supplied with electrical power through a power cord 12 and is connected to the local telephone system network through a telephone line 14 and standard telephone plug 15. An additional telephone line 16 is provided such that a telephone set may be connected to the monitoring device A and therethrough to the telephone system network. The monitoring device is also provided with an integral speaker 56 and an integral microphone 30.

Also shown in FIG. 1, although normally in a far remote location D, is a third telephone line 18 which is connected to a telephone 20 and thereby to an acoustic coupler and modem 22 and a data terminal 24. Telephones, acoustic couplers, modems and data terminals are all widely available and conventionally connected to the telephone system network as shown. Some such installations dispense with the acoustic coupler and provide direct electrical contact between the telephone 20 and the data terminal 24 through the modem 22.

Data generating, processing or recording equipment connected to the telephone system network at a given location may be addressed by calling the telephone number assigned to that location. The present invention takes advantage of this aspect of the telephone network to allow for remote monitoring of local area B automatically by the monitoring device A which reports to the data terminal 24 in machine readable format or to an individual through synthetic speech. This is accomplished by means of the circuit shown in FIG. 2.

Figure 2:
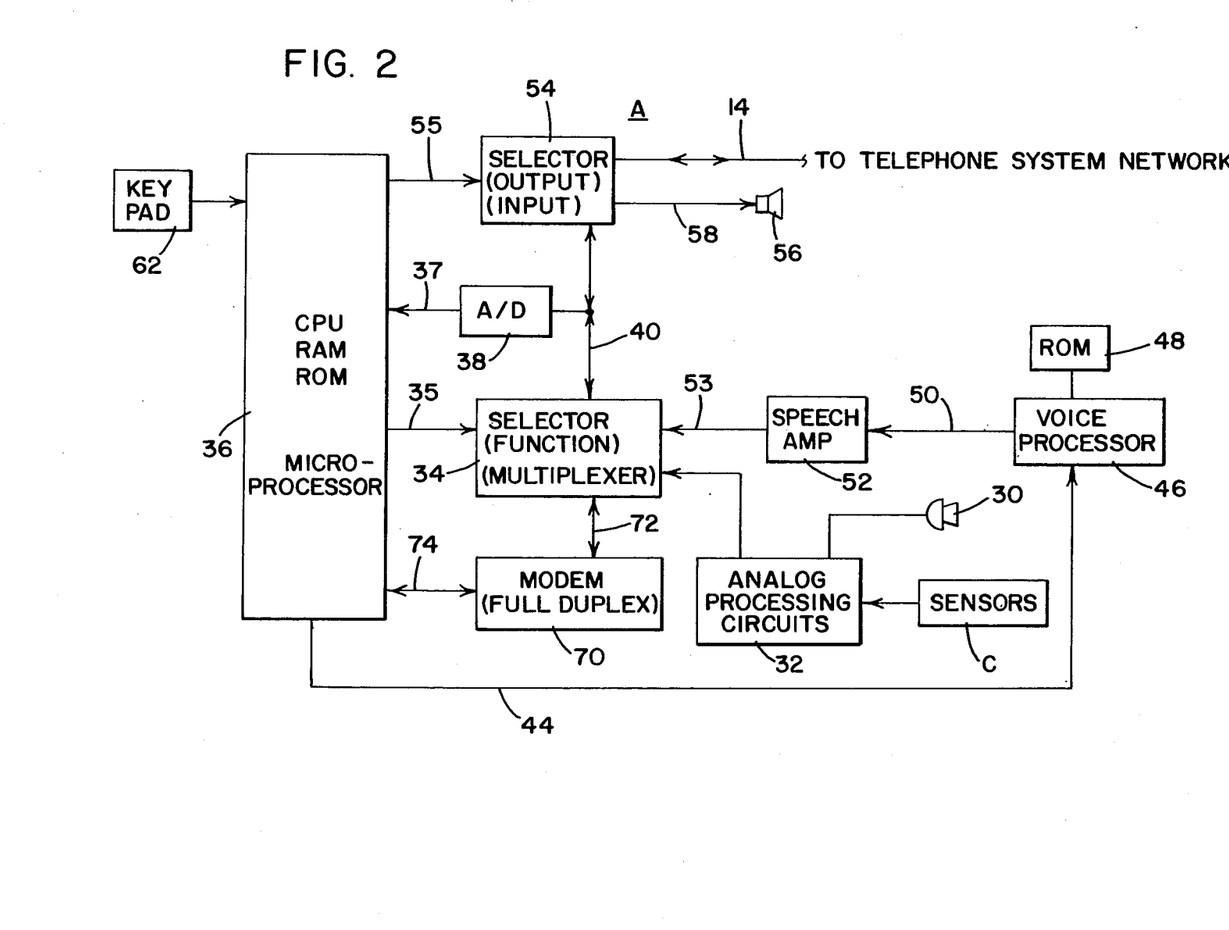
FIG. 2 is a block diagram showing the circuits employed in the preferred embodiment of the present invention.

FIG. 2 shows, in block diagra form, the circuits and elements contained in the monitoring device A shown in FIG. 1. The elements shown and their interconnection are identical to those described in U.S. Pat. No. 4,558,181 with the exception of the modem and the circuitry supporting the modem and the circuitry and bus structure for transmission of code for digital communication. The description of the elements contained in the specification of U.S. Pat. No. 4,558,181 is hereby incorporated in this specification as if fully set forth.

The sensors C shown in FIG. 1 are schematically represented as block C in FIG. 2. These sensors provide electrical outputs either when an alarm condition is sensed or representative of a condition such as temperature. These signals and signals from the microphone 30 are processed by the analog processing circuits 32 into a form which is usable by an analog to digital converter. The signals from the analog processing circuits 32 are applied to a function selector or multiplexer 34. The function selector 34 is controlled through line 35 by a microprocessor 36 to selectively apply a single signal from the analog processing circuits or elsewhere to an analog to digital converter 38 through line 40. The analog to digital converter 38 provides a digital signal to the microprocessor 36 through line 37 representative of its analog input at a given time. By controlling the function selector 34, the microprocessor 36 is able to sequentially read the output signals on each of the sensors C and determine if their outputs are normal or are indicative of an alarm condition. The microprocessor 36 is thereby informed of the conditions being monitored by sensors C and able to give an alarm quickly should an alarm be required.

The monitoring device A has two means of creating signals for the telephone network. The microprocessor 36 is connected through line 44 to a voice processor 46 which cooperates with read only memory (ROM) 48 to create synthetic dialing tones and speech messages initiating a telephone call and identifying the specific location being monitored and the alarm condition being reported or status report being reported. Thus, the microprocessor 36 can address the voice processor 46 and the ROM 48 and causes a telephone dialing sequence to be created, and a message identifying the alarm being reported to be created. This signal is applied through line 50 to the speech amplifier 52 which prepares the signal for application to the telephone lines. The speech amplifier is connected through line 53 to the function selector 34 and thence to line 40 and the output selector 54. The output selector 54 is controlled by the microprocessor 36 through line 55 and applies signals to either a local speaker 56 through line 58 or to the telephone line 14 and thence to the telephone system network for relay to a remote telephone.

The telephone number at which the monitoring device is located, which is used as an identification code, and the telephone numbers which the monitoring device is to call are programmed into the monitoring device A by means of key pad 62. The key pad 62 is also used to set limits on certain sensors such as a temperature sensor when desired.

The above described circuit operates in a manner identical to that described in U.S. Pat. No. 4,558,181.

In addition to the synthetic speech mode of communication described above, the monitoring device A includes provisions for communicating in digital form, such as in the ASCII Code. In this mode, monitoring device A can communicate directly with a personal computer or TTY 24 without the need for human supervision. When communicating in the digital mode, the microprocessor 36 uses both the voice processor 46 and the modem 70. The voice processor is required to initiate a call by means of the creation of dialing tone signals recognizable to the telephone network. Once a telephone connection to a selected telephone number is made by means of application of tone signals to the telephone system network through voice processor 46, the function selector 34 disengages the voice processor and engages the modem 70 to line 40. The microprocessor is thus connected through line 74, modem 70, line 72, function selector 34, line 40, and output selector 54 to the telephone system line 14. This path of communication is bidirectional allowing the microprocessor to send and receive signals. The microprocessor 36 listens for a carrier signal from the modem 22 at the remote location D indicative of connection to a terminal through the telephone network. This carrier provides a "handshake" informing the microprocessor 36 that if may communicate. The microprocessor then creates a digital signal, preferably in the ASCII Code, which states the telephone number from which it is calling and the alarm condition being reported. Once its message has been transmitted, the microprocessor 36 causes the output selector 54 to disconnect from the telephone network.

The circuit described above does not require human intervention to create, transmit or receive an alarm message. The alarm message as described above is received on a TTY terminal which simply prints the message at its printer for immediate or later action as the TTY operator desires. The message may also be received by a personal computer or other smart terminal which may contain previous instructions on how to automatically deal with alarm conditions from the unit being described The modem 70 is a full duplex modem. A full duplex modem can transmit a signal while an incoming signal is still present on its output line 72. This is advntageous in the present situation as most TTY terminals will answer a call by placing a carrier on the telephone circuit and maintaining this carrier until instructed otherwise over the telephone circuit. The full duplex modem allows the microprocessor 36 to speak over the carrier and address the terminal 24.

The circuit of FIG. 2 actually operates in a much more complex manner than outlined above when an alarm situation is noted or when a telephone status inquiry is received. The operation of this circuit is described hereinafter with respect to these two conditions in conjunction with the flow charts shown in FIGS. 3 and 4.

OPERATION

Operation can only take place after programming of the device A. Programming is carried out through the key pad 62 in a manner almost identical to that described for the similar device in U.S. Pat. No. 4,558,181. With the present invention, as with the device of that patent, one places the device near or at the area B to be monitored, connects the device power cord 12 to a power source and connects the device telephone line 14 to the telephone system network through a standard jack. The monitoring device A is now ready for programming. The device's own phone number is programmed in as its ID phone number, temperature limits are programmed in, the time is entered into memory and the number of rings to be allowed before answering is also programmed into memory. These steps are all identical to those set forth in U.S. Pat. No. 4,558,181.

The programming of the numbers to be called is done by entering a phone number associated with each of four telephone number references which may be called by the monitoring device A. The first telephone number is entered as the phone number only. This number is always addressed by the monitoring device A as a digital terminal and will be expected to received coded information only. Phone numbers 2, 3 and 4 can be either digital receiving terminals or voice receiving telephone numbers. When the user programs these numbers into monitoring device A, he is prompted to make a selection between voice or data transmission modes.

Figure 3A:
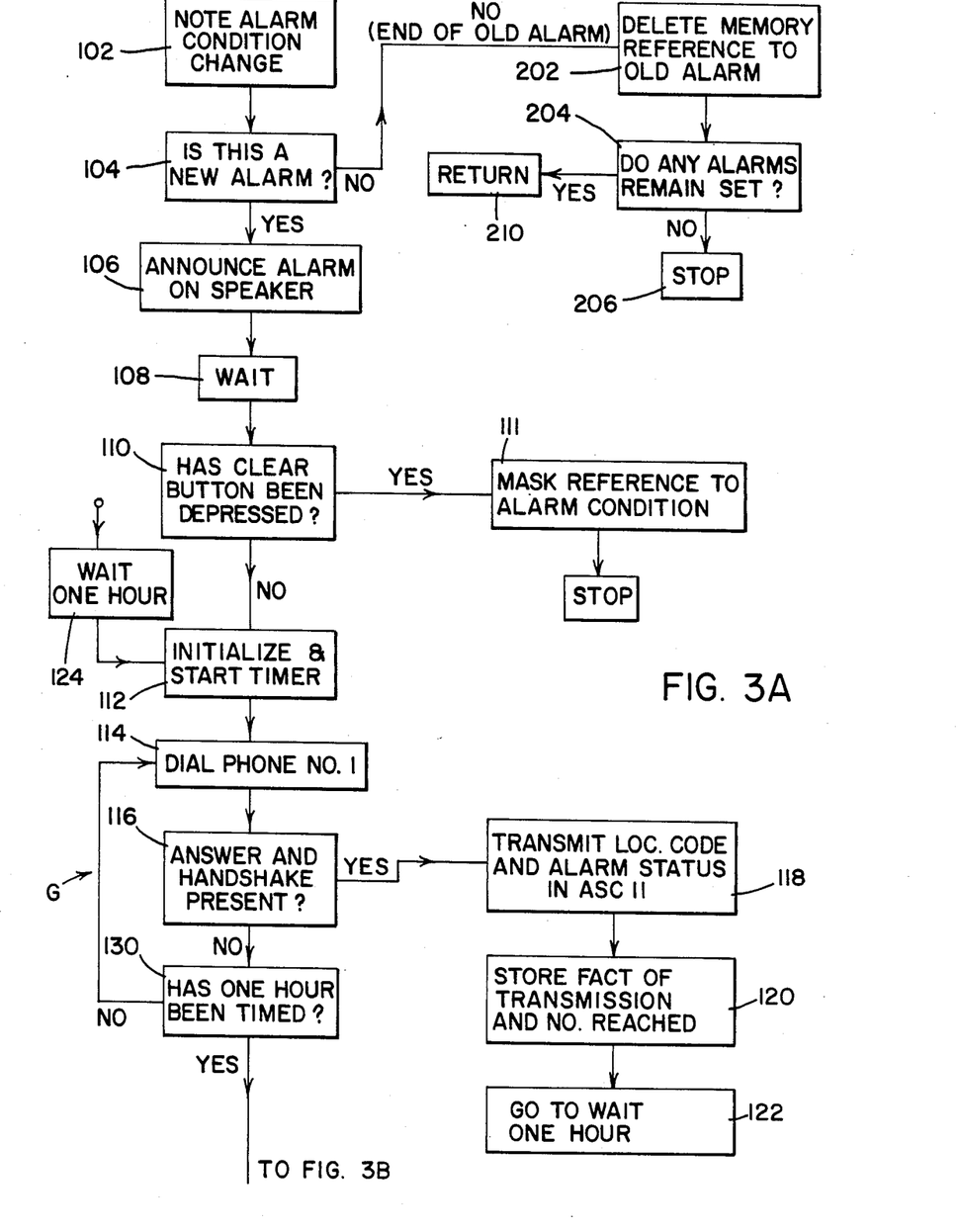
FIG. 3A, 3B and 3C are to be taken together and are a flow chart showing how the circuit of FIG. 2 operates in response to an alarm condition change; and, FIG. 4 is a flow chart showing how the circuit of FIG. 2 operates in response to a status inquiry received over the telephone network.
Figure 3B:
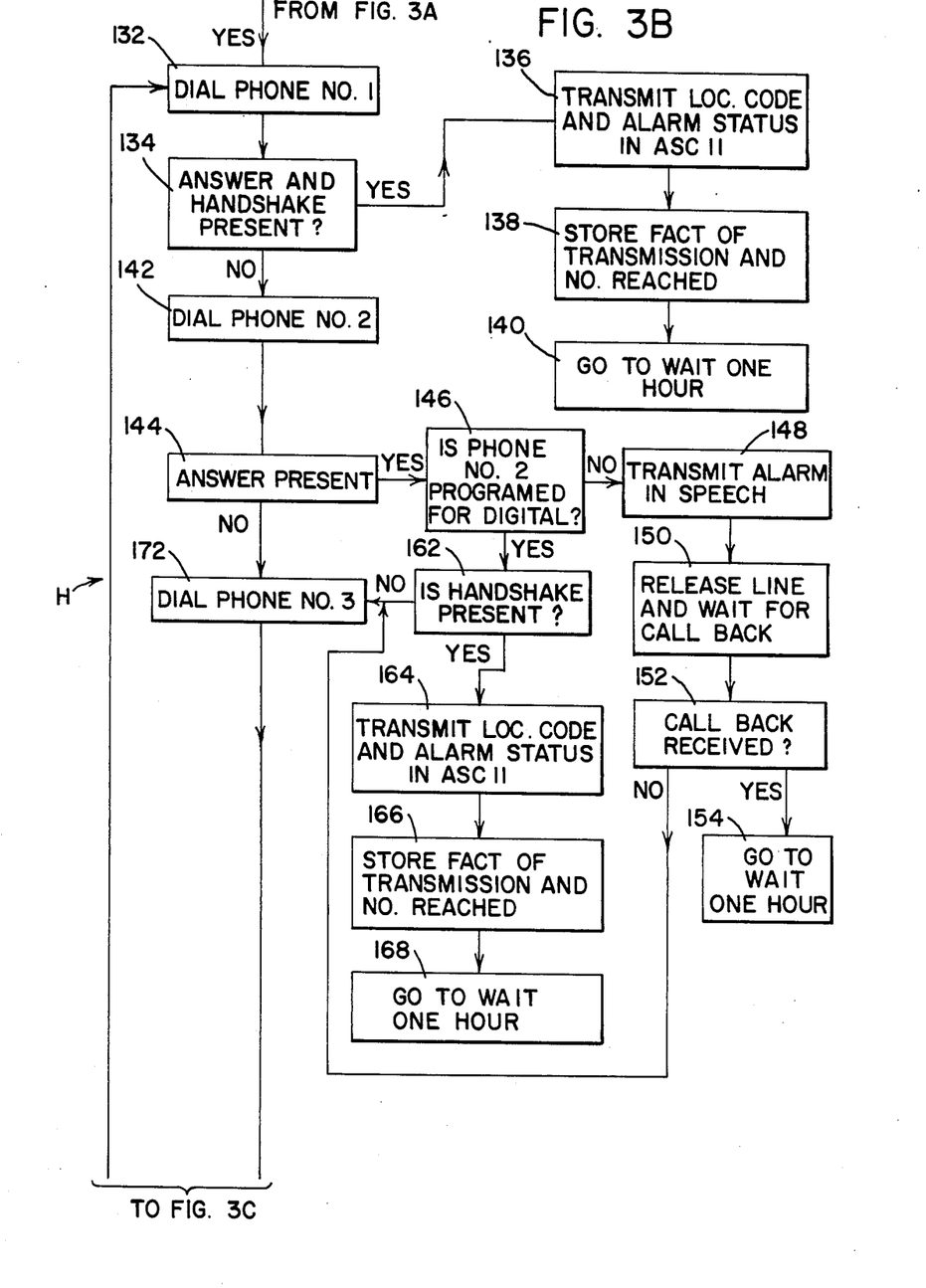
Figure 3C:
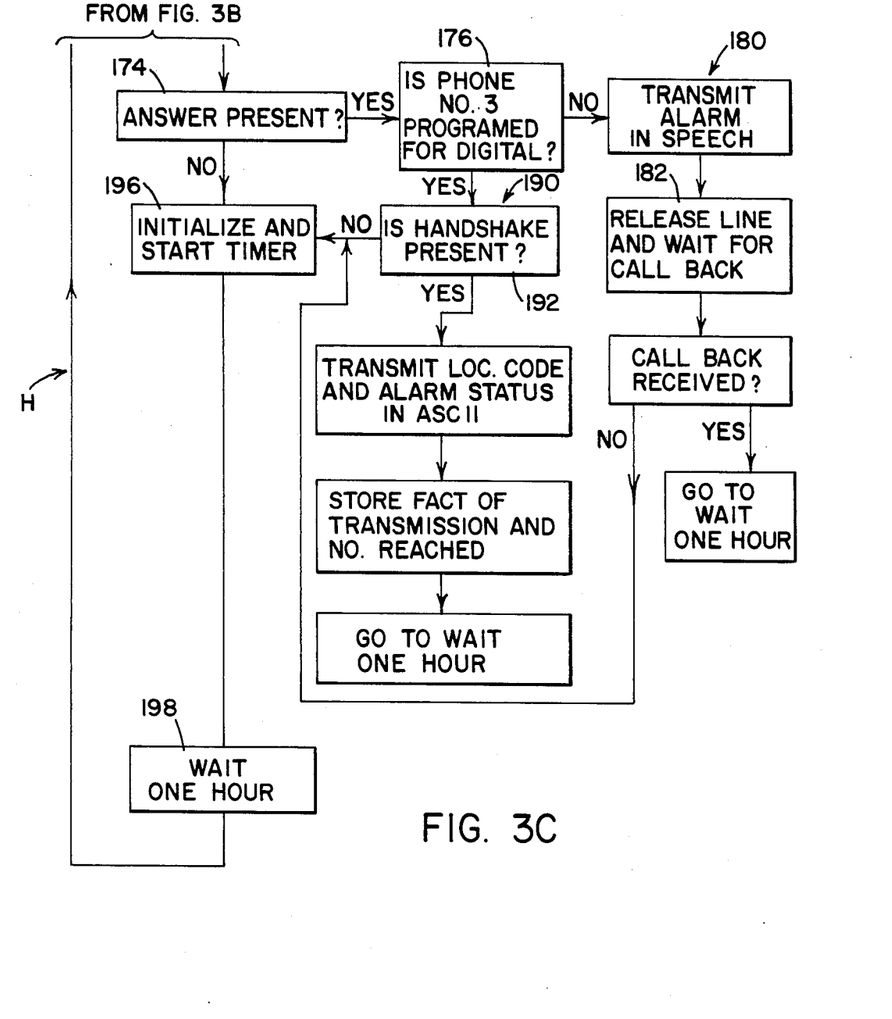

Upon completion of programming, the entries can be checked by asking the monitoring unit to recite back the numbers enetered in the speech mode over the speaker 56. The monitoring device A is now ready for unattended monitoring of the conditions selected by the user. Should an alarm condition occur, such as a sustained noise above the preselected noise level, the monitoring device A will perform the steps schematically set forth in FIG. 3.

THE CALL OUT MODE OF OPERATION

When an alarm condition is sensed by one of the sensors C, or microphone 30, a signal indicative of the particular alarm condition passes through the analog processing circuits 32, the function selector 34, line 40 and the analog to digital converter 38 to the microprocessor 36. This is denoted in FIG. 3 as block 102, the noting of an alarm condition change. The microprocessor 36 determines whether this is a new alarm or the end of an old alarm in decision step 104 and, if a new alarm is present, announces this new alarm on the local speaker 56. This announcement step 106 is followed by a short delay 108 which allows a person at the local area B to deactivate the alarm by depressing the "clear" button on the key pad 62. If the "clear" button is pressed, the microprocessor masks reference to the alarm sensed and exits the call out sequence as someone in the local area is aware of the alarm and can remedy it. As the reference to the alarm condition is masked, the monitoring device A will not attempt to call out to report the existence of the alarm condition.

If the "clear" button is not depressed, a timer in the microprocessor 36 is initialized and started in step 112. The phone number programmed in the memory location 1 is then dialed. This phone number identifies a data receiving terminal such as TTY terminal capable of unattended operation which will answer the phone, present a conventional handshake and receive data transmitted by the monitoring device A. The dialing operation 114 is conducted by the microprocessor 36 sending appropriate instructions to the voice processor 46 such that conventional dialing signals appropriate to the telephone network are created, amplified by the speech amplifier 52, allowed to pass through the function selector 34, the line 40 and the output selector 54. The telephone is dialed and monitoring device A waits for an answer and handshake. After a short delay, a decision 116 is made as to whether contact with the terminal has been established. If contact has been established and verified by the presence of a handshake, the microprocessor 36 causes the selector 34 to disengage the voice processor 46 and the speech amp 52 from the line 40 and engage the modem 70 through line 72 to line 40. The microprocessor then delivers the message information in digital form through line 74 to the modem 70. The modem conditions the message and transmits the message over telephone line 14 and the telephone system network to the receiving telephone 20, the acoustic coupler modem 22 and data terminal 24. The message generated by the microprocessor 36 is thereby printed by the data terminal 24 at the remote location D. The message consists of a location code, and information on the alarm being reported. For example, if the microphone 30 sensed excessive noise as would be caused by a smoke alarm, a message is printed as follows: "LOC (location telephone number) sound" indicating that sound level is at a sustained high level.

The transmission of location code and alarm status in code such as ASCII is shown schematically in FIG. 3 at block 118. Following this transmission, the microprocessor 36 stores the fact of transmission and the telephone number reached by the transmission in its internal RAM in step 120. The microprocessor 36 then enters a transfer state 122 and thence a waiting state denoted by block 124 wherein it remains inactive for one hour. After this hour has elasped, the microprocessor reenters its alarm reporting mode at block 112 by initializing and restarting its internal timer. The microprocessor then recalls the terminal at phone number 1 and again reports the existence of the alarm condition. In this manner, the monitoring device A gives written reports of the alarm condition to the remote terminal every hour until the alarm condition is terminated or action is taken to terminate the call out sequence.

In almost all instances, monitoring device A will be able to reach the data terminal 24 and communicate its alarm. If it reaches a busy signal on the line it continues to redial for up to a full hour or until it reaches the data terminal 24. Thus, if the "answer and handshake present" decision 116 results in a "no" response, the microprocessor 36 checks to see if it has been attempting to reach the data terminal 24 for one hour in step 130 and, if it has not, redials the data terminal telephone number at step 114. After one hour of redialing, the decision step 130 results in a "yes" decision and the microprocessor 36 exits the redialing loop G and enters a sequential loop H for dialing phone numbers 1, 2 and 3.

The sequential loop H starts with the dialing of the phone number for phone 1 connected to the data terminal 24, shown schematically at block 132. The microprocessor 36 waits for an answer and handshake from the remote terminal 24 at decision step 134. If an answer and handshake is received, the monitoring device A will transmit the location code and alarm status at step 136, store the fact of transmission and the number reached at step 138 and go to the wait one hour step 124 through transfer step 140. If an answer and handshake are not present, the microprocessor 36 actuates the speech synthesizer to dial the phone number stored as phone number 2 in step 142. The microprocessor waits for an answer at phone number 2 and, in step 144, determines if there is an answer. If there is no answer, the monitoring device A proceeds to dial phone number 3 in step 172. If there is an answer, the microprocessor 36 determines whether phone number 2 is programmed for a digital transmission or a speech message in step 146. If phone number 2 is programmed for a speech message, the microprocessor activates the voice processor 46 to transmit the alarm in synthesized speech at step 148. The person contacted is informed of the telephone number from which the monitoring device A is calling, the nature of the alarm, and requested to call the monitoring device A back as an acknowledgement of receipt of the alarm. The telephone line is then released in step 152 and the microprocessor 36 waits for a return call. If a return call acknowledgement is received at decision steps 152, the microprocessor goes to the wait one hour state 124 through transfer step 154. The monitoring device A then waits one hour before again attempting to reach the data terminal 24 at telephone number 1.

If, at decision step 146, it is determined from memory information that the phone number 2 is the number of a data terminal, the monitoring device A looks for a handshake at step 162. If a handshake is present, the modem 70 is activated and a digital signal transmitted at block 164 in a manner identical to that described for step 118 and 136. After transmission of the signal, the modem 70 is deactivated and the microprocessor 36 stores the fact of transmission and the number reached at step 166 and goes to the one hour wait state 124 through transfer step 168.

If the handshake is not present in decision step 162, or if a return call acknowledgement is not received from a speech format call at step 152, the microprocessor 36 activates the speech processing unit 46 to dial phone number 3 at step 172. The dialing tones are passed through the speech amplifier 52, the function selector 34 and the output selector 54 to the telephone line 14 to initiate another telephone call. The monitoring device A then looks for an answer on the phone line 14 in decision step 174, determines whether this is a speech number or a digital number from memory in decision step 176 and proceeds to attempt communication with the person or data terminal on the other end of the line through a speech routine 180 identical to that described above with respect to phone number 2 or a data transmission scheme 190 identical to that described with respect to phone number 2 above. If no acknowledgement, either through means of a call back from a person 182 or the presence of a handshake 192 is received, or if no answer is present at answer present step 174, the microprocessor 36 initializes and starts an internal timer sequence 196 and remains inactive for one hour at wait state 198. After one hour has passed, the monitoring device A returns to step 132 and starts the sequential loop H and again attempts to reach phone number 1 then phone number 2 then phone number 3 until it is answered and acknowledged as described above. In this way, if the data terminal 24 cannot be reached after one hour of repeated tries, the monitoring device A will try successively three numbers stored in memory, on an hourly basis, seeking an acknowledgement of its alarm signal. The monitoring device A will continue to seek an acknowledgement once every hour until it receives such an acknowledgement or has tried all three numbers. This call out sequence is repeated hourly until the alarm condition is removed.

More than or less than three telephone numbers can be used as desired by simply changing the number of telephones called in loop H.

When an alarm condition change noted at step 102 is the removal of the causing factor, such as the quieting of a smoke alarm, decision step 104 results in an indication that it is an end of an old alarm and reference to this old alarm is deleted from the memory at step 202. The microprocessor 36 then determines if any other alarm still remain in step 204 and if none remain set, it exits the call out program at stop block 206. If an alarm still remains, then the end of the old alarm signal interrupted the call out program at some point. The microprocessor returns to the point in the call out program at which it was interrupted at return step 210.

From the above detailed description of the operation of the call out operation of the monitoring device A, it can be seen that when an alarm condition is noted, the monitoring device A will try for one hour to reach the data terminal 24 and, if unsuccessful, try two additional telephone numbers. If no acknowledgement is received, it will continue to try to reach these three telephone numbers once every hour so long as the alarm condition exists. The call out mode is only terminated by the clear button at the location of the monitoring device, the removal of all alarm conditions or by a call in to the monitoring device A from a remote terminal as described hereinafter.

THE CALL IN MODE OF OPERATION

Figure 4:
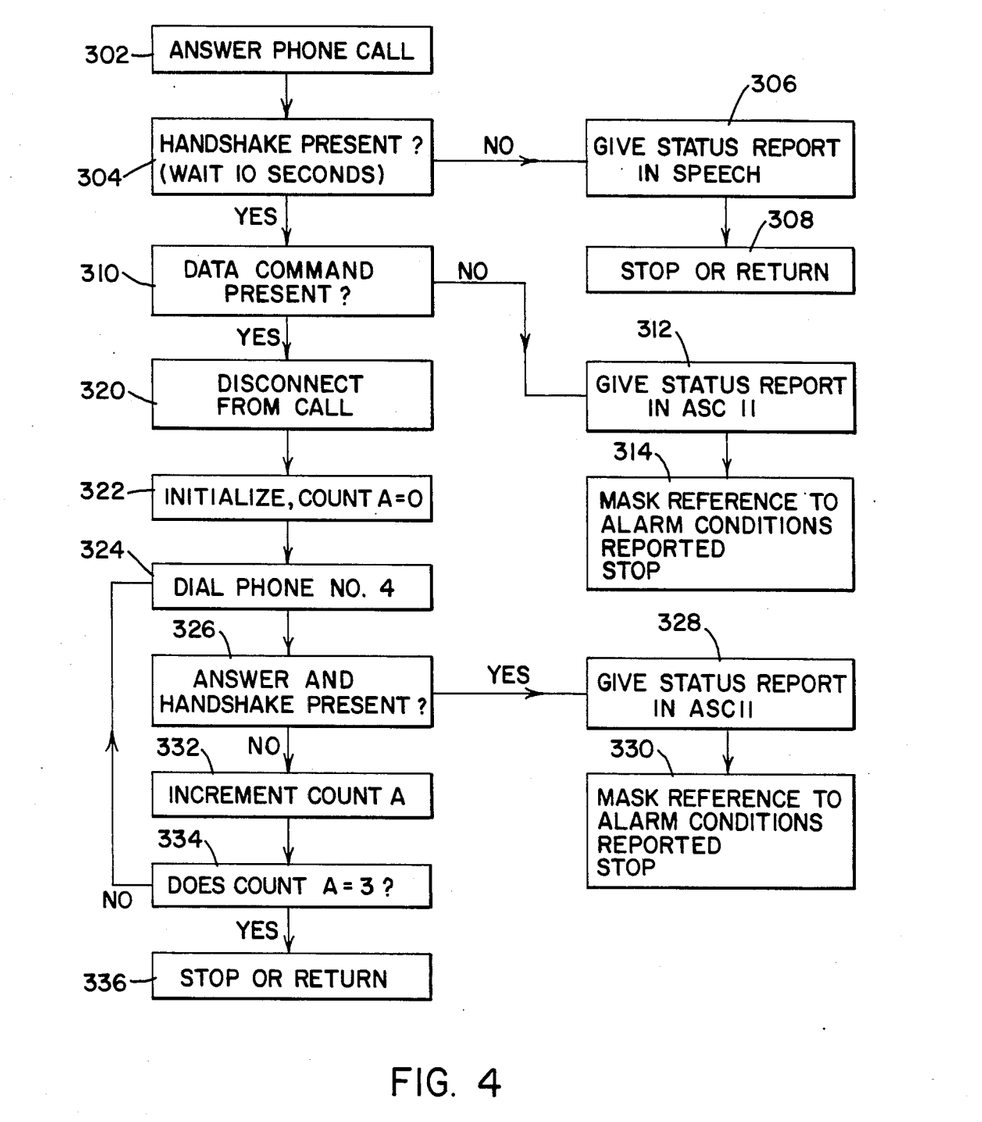

The operation of monitoring device A in the call in mode is illustrated in flow chart form in FIG. 4. When a telephone call is received on telephone line 14, monitoring device answers the phone, shown at block 302, and looks for a data terminal handshake 304. If no handshake is present, the microprocessor 36 engages the voice processor 46 and causes a status report to be given in synthetic speech at step 306. The status report consists of a speech report including the telephone number of the unit called, the correct time, the current temperature, the fact that the electric power is on, the fact that there have been no unusual sounds, the fact the conditions being monitored are okay, and that the battery condition is okay. After giving the status report, the monitoring device A disconnects from the telephone line 14 and exits the call in program at step 308.

If, at the time of calling, an alarm condition exists, the alarm condition is stated as part of the status report. If an alarm message has been sent to a data terminal, the fact will also be reported in speech format when a call in occurs from a person not equipped with the data terminal. The message is stated "warning message received by telephone number xxx-xxx-xxxx". The microprocessor 36 then returns to its state in the call out sequence shown in FIG. 3.

If, at step 304, the modem 70 recognizes a data terminal handshake, the microprocessor 36 will wait for a data command at step 310. If no data command is received, the monitoring device A gives a status report through the modem 70 stating any alarm conditions existing at that time and giving a status report in the data format in step 312. The status report will include the fact that a data terminal has been reached in the call out mode if such communication has occurred. The continued existence of an alarm condition will also be stated.

After giving a complete status report in the data format to the remote terminal calling in, the microprocessor 36 instructs the output selector 54 to terminate the telephone call at the telephone line 14 and masks the memory references to the alarm conditions reported in step 314. This causes the microprocessor to exit the call out sequence illustrated in FIG. 3 and further calls to report existing alarm conditions are not made. A new alarm condition occurring after a status report will reenter the call out sequence at step 102 and start the whole process over again.

The microprocessor 36, through the modem 70, recognizes incoming data format commands from a remote terminal. In particular, at decision step 310, the monitoring device A will wait a short period of time for an instruction calling for a predefined system integrity test. If this command is recognized, the monitoring device A disconnects from the telephone call initiated from outside in step 320, initializes an internal count at step 322 and dials the phone number stored in memory location number 4 in step 324. The monitoring device A waits for an answer and a data terminal handshake at step 326.

When this handshake is received, a full status report is transmitted from the microprocessor 36 through the modem 70 onto the telephone system network to the remote data terminal in step 328. The telephone call is terminated, reference to alarm conditions stored in memory and reported are masked and the program terminated at step 330. If the monitoring device A does not receive an answer and handshake at step 326, it increments the count I at step 332, checks this count to see if it has called out three times at step 334 and, if it has not, dials phone number 4 again seeking an answer and handshake. After three unsuccessful attempts to reach phone number 4, the microprocessor 36 exits the call in program and stops or returns to its previous status in the call out program at step 336.

The above described device and procedure add flexibility in remote sensing applications and allow the use of a remote sensing device by hearing impaired persons or other persons requiring the use of a TTY to effectively use the telephone network. Additionally, increased flexibility in remote sensing is afforded to those wishing written records of alarm notations through use of a TTY or an intelligent terminal such as a personal computer. By use of the later, one can be provided with a summary of alarm signals and status reports when desired automatically and alarm call outs can be automatically stopped by programming the personal computer to respond to selected alarm signals by returning a telephone call to the monitoring device A and accepting a status report leading the monitoring device A to exit its call out program.

Having thus described the invention, it is claimed:

1. A portable, self-contained device for monitoring a selected local area, having a standard telephone terminal for connection to a standard external telephone line, said device adapted to report occurrence of any of a plurality of preselected conditions adjacent said local area, said device comprising:

(a) means for setting in said device a first identification number corresponding to a telephone number for the external telephone phone line into said selected local area;

(b) means for selectively connecting said device onto said external telephone line installed at said selected local area;

(c) means for creating in said device a first distinct signal upon occurrence of one of said plurality of preselected conditions;

(d) synthetic speech generator means for generating in said device a first synthetic voice message in response to said distinct signal;

(e) means for amplifying and playing said first synthetic voice message at said local area upon its creation;

(f) means causing said synthetic speech generator to create a first telephone format dialing signal corresponding to a second identification number of a first, remote preselected telephone in response to said distinct signal;

(g) means applying said dialing signal to said external telephone line and thereby initiating a telephone call;

(h) means for creating an answer and handshake present signal upon recognizing the occurrence of an answer and handshake at said first remote telephone;

(i) a modem for creating a telephone compatible digital information signal in response to said answer and handshake present signal, said digital signal including a representation of said first identification number;

(j) switch means directing said digital signal onto said telephone line;

(k) means terminating said telephone call;

(l) means for reobtaining a dial tone when an answer and handshake present signal is not generated and cycling means for repeatedly creating said first dialing signal and seeking an answer and handshake at said first remote telephone for a preselected period of time;

(m) means responsive to the absence of said answer and handshake present signal for said preselected period of time causing said synthetic speech generator to create a second telephone format dialing signal corresponding to the identification number of a second, remote preselected telephone;

(n) means applying said second dialing signal to said external telephone line and thereby initiating a telephone call;

(o) means creating an answer signal upon recognizing the occurrence of an answer at said second remote telephone;

(p) preprogrammed means creating a digital compatible indicator signal if said second preselected telephone is capable of the receipt of digital information;

(q) means creating a handshake present signal if a digital handshake is received from said second remote telephone;

(r) means activating said switch means for directing said digital signal to said telephone line if said handshake present signal is present; and (s) means causing said synthetic speech generator to create a second synthetic voice signal in response to the absence of said digital compatible indicator signal, said second synthetic voice signal includes a representation of said first identification number and means applying said second synthetic voice signal to said telephone line.

2. A portable, self-contained device for monitoring a selected local area, having a standard telephone terminal connected to standard external telephone lines of a standard commercial telephone system for occurrence of any of a plurality of preselected conditions adjacent said local area, said device comprising:

(a) means for answering a telephone call to said device on said telephone lines;

(b) means for determining the presence of a digital terminal handshake on said telephone lines and creating a handshake present signal in response thereto;

(c) means creating a synthetic speech report including an identification code identifying the local area being monitored and status information on said preselected conditions and terminating said telephone call after completion of said report in the absence of a handshake present signal;

(d) means operable in response to the occurrence of a handshake present signal creating a data command present signal if a data command is present on said telephone line;

(e) means creating a digital format telephone system acceptable message including said first identification code representative of the local area being monitored and information on the status of said preselected conditions, applying said digital message to said external telephone lines and terminating said telephone call upon the completion of said report in the presence of a handshake present signal and the absence of a data command present signal; and, (f) means terminating said telephone call after sensing the presence of a data command signal and applying a dialing signal to said telephone lines initiating a telephone call, determining the presence of an answer and digital handshake on said telephone lines, creating a digitally encoded telephone system acceptable message including an identification code identifying the location being monitored and the status of conditions being monitored and applying said message to said telephone lines as intelligence, masking memory references to alarm conditions reported and, in the absence of an answer and handshake present signal, means for repeating the application of said telephone format dialing signal to said telephone lines and seeking the presence of answer and handshake signal.

3. A method for monitoring a selected local area with a device having a standard telephone terminal connected to standard external telephone lines of a standard commercial telephone network for occurrence of any of a plurality of preselected conditions adjacent said local area, said method comprising:

(a) setting a first identification code in said device corresponding to a telephone number for said standard external telephone lines into said selected local area;

(b) automatically answering a telephone call directed to said device on said standard external telephone lines;

(c) determining if a digital communications format handshake is present on said external telephone lines and creating a handshake present signal in response thereto;

(d) in the absence of a handshake present signal, creating a synthetic speech message including information corresponding to an identification code for said local area external telephone lines and information on the status of said preselected conditions, applying said synthetic speech message to said external telephone lines as intelligence and terminating said telephone call;

(e) in the presence of a handshake present signal, determining if a data command is present on said external telephone lines and generating a data command present signal in the presence of such command;

(f) in the absence of a data command present signal, creating a digitally encoded telephone system acceptable message including an identification code for said local area external telephone lines and the status of said preselected conditions, masking references to alarm conditions reported and terminating said telephone call;

(g) in the presence of a data command present signal, terminating said telephone call, initiating a second telephone call by creating and applying to said external telephone lines a telephone format dialing signal corresponding to an identification code of a remote preselected telephone connected to said commercial telephone network, determining whether an answer and digital handshake is present on said external telephone lines and creating an answer and handshake present signal in the presence thereof; in the presence of said answer and handshake present signal, applying said digitally encoded telephone system acceptable message to said external telephone lines, masking references to alarm conditions reported and disconnecting said second telephone call; in the absence of said answer and handshake present signal, terminating said second telephone call and reapplying said telephone format dialing signals to said external telephone line seeking an answer and handshake present signal.

4. A self-contained device for monitoring a selected local area comprising:

(a) sensing means monitoring conditions at said local area and generating signals regarding said conditions;

(b) a microprocessor;

(c) switch means selectively applying signals from said sensing means to said microprocessor;

(d) memory associated with said microprocessor;

(e) means for storing a plurality of identification codes representative of a plurality of telephone numbers in said memory;

(f) an electronic speech synthesizer selectively creating telephone system compatible dialing tone signals and speech element audio frequency signals in response to speech creation signals from said microprocessor;

(g) a modem adapted to create telephone system acceptable digital information containing signals based upon digital information received from said microprocessor and microprocessor acceptable digital signals based upon information received from said telephone system;

(h) means connecting said switch means to a telephone line in turn connected to said telephone system;

(i) said switch means sequentially connecting said speech synthesizer to said telephone line, transmitting dialing tone signals created by said speech synthesizer corresponding to one of said identification codes and then connecting said modem to said telephone line whereby said microprocessor may initiate a telephone call and transmit a digital information containing signal over said telephone system;

(j) means responding to an incoming telephone call on said telephone line;

(k) means determining if a digital communications format handshake is present on said telephone line and creating a handshake present signal in response thereto;

(l) means causing said speech synthesizer to create a synthetic speech message including information corresponding to an identification code for said local area external telephone lines and information on the status of said preselected conditions, apply said synthetic speech message to said external telephone line as intelligence and terminate said incoming telephone call in the absence of a handshake present signal;

(m) means generating a data command present signal if a data command is present on said external telephone line in the presence of a handshake present signal;

(n) means creating a digitally encoded telephone system acceptable message including an identification code for said telephone line and the status of said preselected conditions, masking references to alarm conditions reported and terminating said incoming telephone call in the absence of a data command present signal;

(o) means terminating said incoming telephone call, initiating a test call by causing said speech synthesizer to create a telephone format dialing signal corresponding to an identification code of a remote preselected telephone connected to said commercial telephone network, applying said dialing signal to said telephone line, determining whether an answer and digital handshake is present on said telephone line and creating an answer and handshake present signal in the presence thereof; in the presence of said answer and handshake present signal, applying said digitally encoded telephone system acceptable message to said telephone line, masking references to alarm conditions reported and disconnecting said test call; in the absence of said answer and handshake present signal, terminating said test call and reapplying said dialing signal to said telephone line seeking an answer and handshake present signal.

* * * * *